July 21, 1953 T. G. AITCHESON 2,645,972
ADJUSTMENT MECHANISM FOR MICROSCOPES
Filed Nov. 12, 1949
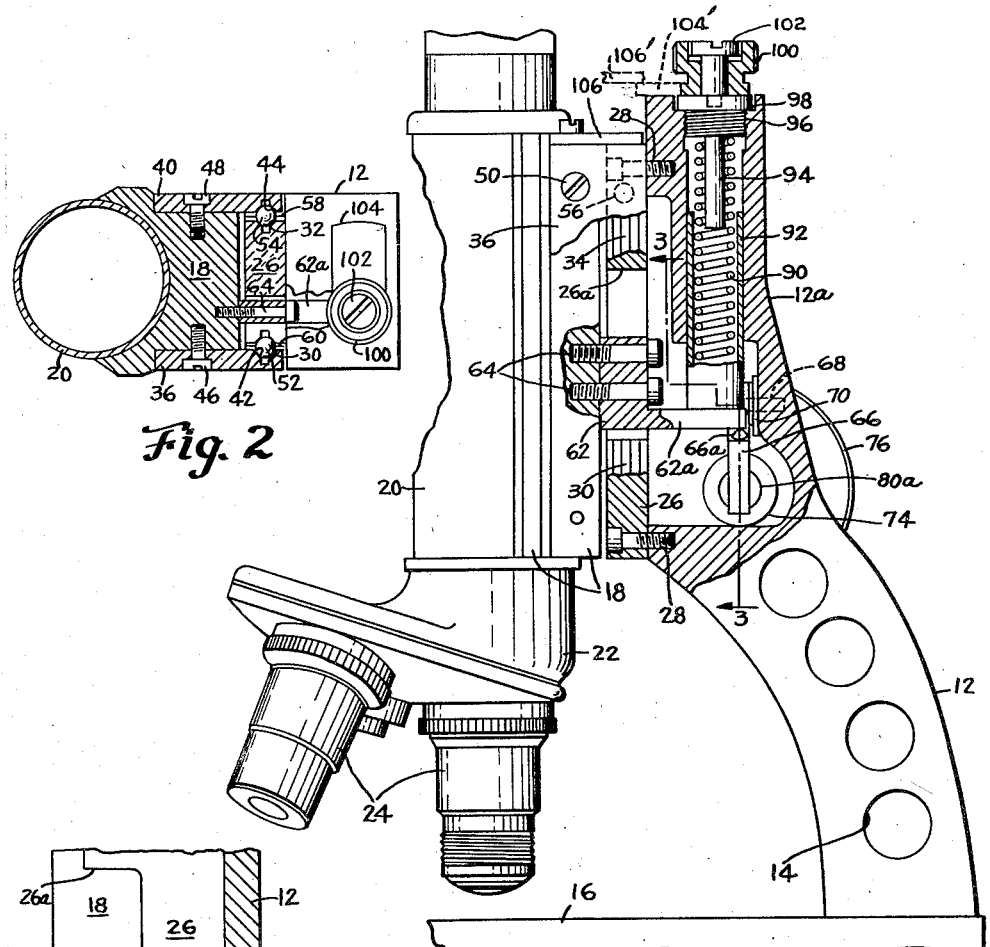
Fig. 2
Fig. 1
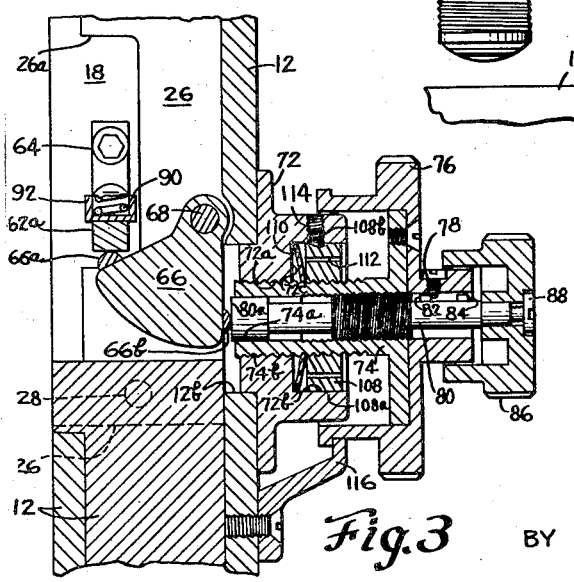
Fig. 3
INVENTOR
THOMAS G. AITCHESON
BY
ATTORNEYS Patented July 21, 1953

2,645,972

UNITED STATES PATENT OFFICE 2,645,972

ADJUSTMENT MECHANISM FOR MICROSCOPES

Thomas G. Aitcheson, Kenmore, N. Y., assignor to American Optical Company, Southbridge, Mass., a voluntary association of Massachusetts Application November 12, 1949, Serial No. 126,831

4 Claims. (Cl. 88—39)

This invention relates to improvements in microscopes and more particularly to improved means for adjusting the body tube of a microscope relative to an object or specimen.

An object of the invention is to provide improved and simplified means for performing coarse and fine adjustments of the body tube.

Another object is to provide a coarse and fine adjustment mechanism which employs given components for both adjustments thus permitting a construction which is relatively compact and of light weight.

A further object of the invention is to provide coarse and fine adjustment means which are uniaxial and which have contiguous actuating knobs so that substantially no change in position of the operator's hand is required for operating either means.

Still another object of the invention is to provide a fine adjustment means which is rotationally carried by the coarse adjustment means during operation of the latter, but which is also independently operative for performing the fine adjustment.

A still further object of the invention is to provide a locking means for the body tube which prevents a bias from being transmitted to the coarse and fine adjustment mechanism when the microscope is not in use and which may be used to prevent shock from being transmitted to the mechanism when the instrument is being moved from place to place.

Another object of the invention is to provide a light weight yet sturdy general construction such as may be adapted to the requirements of a field microscope.

These and other objects of the invention will be apparent from the following description taken in connection with the accompanying drawings, wherein like reference characters refer to like parts throughout the several views of which:

Figure 1 is a side elevation view, partly in cross-section and with parts broken away of a microscope embodying constructions of the invention;

Fig. 2 is a top plan view, partly in cross-section of a portion of the microscope shown in Fig. 1; and Fig. 3 is a fragmentary cross-sectional rear view of the coarse and fine adjustment mechanism taken along the line 3—3 of Fig. 1.

Referring to Fig. 1, an arm 12, having perforations 14 formed therein to facilitate light weight of the instrument, is attached to a base portion 16. Arm 12 adjustably supports a body tube assembly comprising a body tube block 18 which carries the usual body tube 20, nosepiece 22, objectives 24 et cetera, the eyepiece, stage and substage assembly not being shown. Body tube block or support 18 is slidably connected with a bearing block 26, more fully shown in Figs. 2 and 3, the latter being rigidly attached to arm 12 by a plurality of screws 28. Bearing block 26 has lower ball bearing ways 30 and 32 and upper ball bearing ways 34 (Figs. 1 and 2), the remote upper way not being shown. Plates 36 and 40, having ball bearing ways 42 and 44 formed therein, are rigidly attached to body tube block 18 by a plurality of screws indicated by 46, 48 and 50. A plurality of ball bearings, represented by 52, 54 and 56 are interposed between the respective ways or channels and spacer elements 58 and 60 (Fig. 2) may appropriately be provided therefor. Said arrangement of ball bearings and ways permits linear movement of the body tube.

An angular lifting stud or bracket 62 is rigidly attached to body tube block 18, as by screws 64, a portion 62a of said stud protruding inwardly into arm assembly 12. Stud 62 is employed for moving body tube 20 upwardly and downwardly. The stud 62 is permitted to move vertically, without interference from bearing block 26, by a construction of the latter such that an indented or excised portion 26a is formed therein and, accordingly, the stud is allowed to move freely.

The coarse and fine adjustment mechanism, shown in part in Fig. 1 and more fully in Fig. 3, engages inwardly extending portion 62a of the stud. A lever 66, which may appropriately be in the form of a sector, as shown, or in some other form such as a bell-crank, is pivotally attached to arm assembly 12, as by a pivot 68 inserted in a boss 70 projecting from arm portions 12a. Lever 66 is provided with bearing means 66a and 66b to provide a more positive contact and to reduce friction between said means and parts in contact therewith.

Further referring to the coarse and fine adjustment mechanism, a circular bearing member 72 is fixedly attached to microscope arm 12, an aperture 12b being formed in a wall of said arm to provide access therewithin. Member 72 includes a threaded aperture 72a and a smooth-bored aperture 72b. The coarse adjustment screw 74 is threadedly engaged within aperture 72a so as to be moved horizontally when rotated. Screw 74 is actuated by a coarse adjustment knob 76 carrying a limit stop component 78 protruding inwardly from portions thereof. The fine adjustment screw 80 is threadedly engaged within the coarse adjustment screw so as to extend longitudinally and coaxially thereof, the threads 80b of said screw being finer than threads 74b of the coarse adjustment screw 74. Fine adjustment screw 80 carries a pair of limit stop components 82 and 84 and comprises a circular end portion 80a which is freely rotatable within circular bearing area 74a of the coarse adjustment screw, said end portion projecting from the end of screw 74 and bearing against bearing means 66b of the lever 66. A fine adjustment knob 86 is attached to an extremity of screw 80 by a retaining screw 88.

Further referring to the coarse and fine adjustment mechanism, a compression spring 90 is employed to provide a bias against stud portion 62a which, in turn, is transmitted to bearing means 66a of lever 66 thus causing bearing portion 66b to bear against the fine adjustment screw end portion 80a. The bias applied by spring 90 takes up any play or lost motion between components of the mechanism. Spring 90 is partially encased and supported in a tube or sleeve 92 and is further supported by a post 94. Post 94 is fixedly attached to a cap 96 threadedly engaging arm portions 12a, said cap having an integral circumferential flange which bears upon a shoulder 98 formed in arm portions 12a. Cap 96, when tightened to the limit determined by shoulder 98, provides a predetermined compression of spring 90.

Means for holding the body tube 20 in an elevated locked position when the microscope is not in use so as to relieve the coarse and fine adjustment mechanism of bias applied thereto by the body tube and by spring 90 is provided as follows. A knob 100 is rotatably mounted upon cap 96 by pivotal means 102 which is screw threaded into cap 96 (Figs. 1 and 2). An arm 104 (Fig. 2) is fixedly attached to knob 100 and overlies the top surface of arm portion 12a. When the body tube is raised, for example, from the position shown in Fig. 1, to its maximum or highest vertical position by manually gripping the body tube 20 and lifting same relative to the arm 12 and base 16, knob 100 may be rotated so that an outer free end portion of arm 104 is caused to pass beneath a plate 106 (Fig. 1) attached to the body tube block 18 and between plates 36 and 40, thus holding the plate 106 and accordingly the body tube at said elevated position as indicated by dotted lines 104' and 106'.

Again referring to Figs. 1 and 3, means are provided for causing fine adjustment screw 80 to rotate with, or to be carried by, coarse adjustment screw 74 when the latter is adjusted, but for holding the coarse adjustment screw stationary when the fine adjustment screw is adjusted. This is accomplished by means providing an additional axial load upon the threads of the coarse adjustment screw only. Said means comprise a nut 108 which is threadedly engaged with the coarse adjustment screw. A slidable relation between surface 108a of said nut and apertured surface 72b of member 72 is provided. A cup spring washer 110 or other biasing device which produces uniform pressure against nut 108 is positioned between said nut and surface 72c of member 72. The axial load provided by spring 110 may be adjusted by turning nut 108 as permitted by spanner wrench holes 112. When a desired load is established relative to nut 108, said nut is held against rotation by a conically pointed set screw 114 engaging a recess 108b formed in the nut. It is to be understood that set screw 114 is inserted only to a depth which prevents nut 108 from turning and that said set screw does not introduce any force which is perpendicular to the axis of coarse adjustment screw 74 and which would cause binding of nut 108 and coarse adjustment screw 74. A limit stop 116, adapted to engage flanged portions 76a and 76b of the coarse adjustment knob is provided to limit the movement of the coarse adjustment screw. It will be noted that all of the fine adjustment limit stop components 78, 82 and 84 are carried in a horizontal direction during movement of the coarse adjustment screw 74 without changing their relative position, because the fine adjustment screw 80 is carried by the coarse adjustment screw. A change in the relative position of said fine adjustment components occurs only through rotation of the fine adjustment knob.

The constructions, above-described, have advantages which are apparent where light weight and convenience of operation are of importance. Single elements of the mechanism are frequently employed to serve in both the coarse and fine adjustment operations thus reducing the number of elements required. The action of the mechanism is sufficiently precise for effecting all necessary movements of the body tube. The contiguous relation of the coarse and fine adjustment knobs provides an improved ease of operation. Although the constructions shown herein constitute a preferred embodiment, it will be apparent that the coarse and fine threads, as shown in Fig. 3, could be reversed as to position and provide an operative device. Various modifications of the mechanism herein described will be apparent. Accordingly, such examples as have been presented are to be considered as illustrative and the invention may be otherwise embodied and practiced within the scope of the following claims.

I claim:

1. In a microscope having a movable assembly for supporting a body tube, an arm, bearing means operatively connecting said movable assembly to said arm so as to permit rectilinear movement only of said assembly relative to said arm, spring means for urging said assembly in a given direction relative to said arm, a combined coarse and fine adjustment mechanism for urging said assembly in the opposite direction, said mechanism comprising lever means pivotally mounted on said arm and operatively engaging said assembly for transmitting movement thereto, supporting means in normally fixed relation to said arm and having a threaded aperture formed therein, rotatable coarse adjustment screw means operatively engaging the threads of said aperture and having a bore which is at least partially threaded extending therethrough, the threads in said bore being relatively fine in relation to the threads formed in said aperture, rotatable fine adjustment screw means extending through said bore and operatively engaging the threads thereof, an extremity of said fine adjustment screw means bearing against said lever means in a direction so as to oppose the pressure exerted on said assembly by said spring means, a first actuating means for rotating said coarse adjustment screw means, a second actuating means for rotating said fine adjustment screw means, and adjustable means engaging a part fixed relative to said arm and said coarse adjustment screw means for applying to said coarse adjustment screw means a frictional resistance of variable amounts to the rotation thereof, whereby said combined adjustment mechanism may be adjusted so that rotational movement of said first actuating means will provide coarse adjustment of said assembly and rotational movement of said second actuating means will provide only fine adjustment of said assembly.

2. In a microscope having a movable assembly for supporting a body tube, an arm, bearing means operatively connecting said movable assembly to said arm so as to permit rectilinear movement only of said assembly relative to said arm, spring means for urging said assembly in a given direction relative to said arm, a combined coarse and fine adjustment mechanism for urging said assembly in the opposite direction, said mechanism comprising lever means pivotally mounted on said arm and operatively engaging said assembly for transmitting movement thereto, supporting means in normally fixed relation to said arm and having a threaded aperture formed therein, rotatable coarse adjustment screw means operatively engaging the threads of said aperture and having a bore which is at least partially threaded extending therethrough, the threads in said bore being relatively fine in relation to the threads formed in said aperture, rotatable fine adjustment screw means extending through said bore and operatively engaging the threads thereof, an extremity of said fine adjustment screw means bearing against said lever means in a direction so as to oppose the pressure exerted on said assembly by said spring means, a first actuating means for rotating said coarse adjustment screw means, a second actuating means for rotating said fine adjustment screw means, adjustable means engaging a part fixed relative to said arm and said coarse adjustment screw means for applying to said coarse adjustment screw means a frictional resistance of variable amounts to the rotation thereof, whereby said combined adjustment mechanism may be adjusted so that rotational movement of said first actuating means will provide coarse adjustment of said assembly and rotational movement of said second actuating means will provide only fine adjustment of said assembly, and readily operable means for locking said assembly in an inoperative position out of engagement with said lever means when the microscope is not in use, said readily operable means comprising a latch pivotally mounted on said arm and movable into engagement with a fixed part carried by said assembly for preventing movement of said assembly in said given direction by pressure exerted by said spring.

3. In a microscope having a movable assembly for supporting a body tube, an arm, bearing means operatively connecting said movable assembly to said arm so as to permit rectilinear movement only of said assembly relative to said arm, spring means for urging said assembly in a given direction relative to said arm, a combined coarse and fine adjustment mechanism for urging said assembly in the opposite direction, said mechanism comprising lever means pivotally mounted on said arm and operatively engaging said assembly for transmitting movement thereto, supporting means in normally fixed relation to said arm and having a threaded aperture formed therein, rotatable coarse adjustment screw means operatively engaging the threads of said aperture and having a bore which is at least partially threaded extending therethrough, the threads in said bore being relatively fine in relation to the threads formed in said aperture, rotatable fine adjustment screw means extending through said bore and operatively engaging the threads thereof, an extremity of said fine adjustment screw means bearing against said lever means in a direction so as to oppose the pressure exerted on said assembly by said spring means, a first actuating means for rotating said coarse adjustment screw means, a second actuating means for rotating said fine adjustment screw means, a nut threaded on said coarse adjustment screw means, and resilient means engaging said nut and a fixed part on said arm for applying to said coarse adjustment screw means a frictional resistance of variable amounts to the rotation thereof, said nut being adjustable along the threads of said coarse adjustment screw means for varying said resistance, whereby said combined adjustment mechanism may be adjusted so that rotational movement of said first actuating means will provide coarse adjustment of said assembly and rotational movement of said second actuating means will provide only fine adjustment of said assembly.

4. In a microscope having a movable assembly for supporting a body tube, an arm, bearing means operatively connecting said movable assembly to said arm so as to permit rectilinear movement only of said assembly relative to said arm, spring means for urging said assembly in a given direction relative to said arm, a combined coarse and fine adjustment mechanism for urging said assembly in the opposite direction, said mechanism comprising lever means pivotally mounted on said arm and operatively engaging said assembly for transmitting movement thereto, supporting means in normally fixed relation to said arm and having a threaded aperture formed therein, rotatable coarse adjustment screw means operatively engaging the threads of said aperture and having a bore which is at least partially threaded extending therethrough, the threads in said bore being relatively fine in relation to the threads formed in said aperture, rotatable fine adjustment screw means extending through said bore and operatively engaging the threads thereof, an extremity of said fine adjustment screw means bearing against said lever means in a direction so as to oppose the pressure exerted on said assembly by said spring means, a first actuating means for rotating said coarse adjustment screw means, a second actuating means for rotating said fine adjustment screw means, adjustable means engaging a part fixed relative to said arm and said coarse adjustment screw means for applying to said coarse adjustment screw means a frictional resistance of variable amounts to the rotation thereof, whereby said combined adjustment mechanism may be adjusted so that rotational movement of said first actuating means will provide coarse adjustment of said assembly and rotational movement of said second actuating means will provide only fine adjustment of said assembly, and limiting stop means for controlling the extent of movement of said coarse and fine adjustment screw means.

THOMAS G. AITCHESON.

References Cited in the file of this patent

UNITED STATES PATENTS

| Number | Name | Date |
| --- | --- | --- |
| 703,047 | Dieckmann | June 24, 1902 |
| 1,110,266 | Kaufmann | Sept. 8, 1914 |
| 1,968,094 | Ott | July 31, 1934 |
| 2,328,211 | Harper | Aug. 31, 1943 |

FOREIGN PATENTS

| Number | Country | Date |
| --- | --- | --- |
| 11,261 | Great Britain | of 1901 |